United States Patent [19]

Kennel

[11] Patent Number: 4,872,693
[45] Date of Patent: Oct. 10, 1989

[54] COMBINATION INFANT SEAT AND STROLLER

[76] Inventor: Gordon Kennel, P.O. Box 1110, Havre, Mont. 59501

[21] Appl. No.: 241,764

[22] Filed: Sep. 7, 1988

Related U.S. Application Data

[63] Continuation of Ser. No. 6,491, Jan. 23, 1987, abandoned.

[51] Int. Cl.⁴ ............................................... B62B 7/10
[52] U.S. Cl. .................................... 280/30; 280/643; 280/43.15; 280/47.38
[58] Field of Search .................. 280/30, 7.1, 9, 10, 280/11, 43.14, 43.15, 43.24, 641, 643, 648, 47.38; 297/130, 250, 254, 377

[56] References Cited

U.S. PATENT DOCUMENTS

| | | | |
|---|---|---|---|
| 75,755 | 3/1868 | Hathaway | 280/43.14 |
| 142,615 | 9/1873 | Clark | 280/43.15 |
| 525,187 | 8/1894 | Burkholder | 280/43.24 |
| 1,260,476 | 3/1918 | Tamol | 280/9 |
| 1,693,633 | 12/1928 | Allen | 280/31 |
| 1,727,335 | 9/1929 | Chatfield | 280/31 |
| 1,967,332 | 7/1934 | Smith | 280/43.24 |
| 2,126,303 | 8/1938 | Anderson | 280/43.15 |
| 2,541,327 | 2/1951 | Billinghurst | 280/43.15 |
| 2,706,642 | 4/1955 | Yarnell | 280/30 |
| 2,720,911 | 10/1955 | Lantz | 280/30 |
| 2,803,468 | 8/1957 | Thompson | 280/30 |
| 3,079,162 | 2/1963 | Michels Jr. | 280/7.1 |
| 3,100,651 | 8/1963 | Reese | 280/30 |
| 3,116,069 | 12/1963 | Dostal | 280/30 |
| 3,290,050 | 12/1966 | Ezquerra | 280/30 |
| 3,549,164 | 12/1970 | Raynor | 280/30 |
| 3,659,865 | 5/1972 | Notbacker | 280/7.1 |
| 3,829,113 | 8/1974 | Epelbaum | 280/30 |
| 3,944,241 | 3/1976 | Epelbaum | 280/30 |
| 4,033,622 | 7/1977 | Boudreau | 297/250 |
| 4,084,849 | 4/1978 | Ishida et al. | 297/377 X |
| 4,186,962 | 2/1980 | Meeker | 297/250 |
| 4,231,612 | 11/1980 | Meeker | 297/250 |
| 4,274,674 | 6/1981 | Deloustal | 297/250 |
| 4,632,409 | 12/1986 | Hall et al. | 280/30 |
| 4,679,804 | 6/1987 | Johnson | 280/30 |

*Primary Examiner*—Charles A. Marmor
*Assistant Examiner*—Tamara L. Finlay
*Attorney, Agent, or Firm*—Fulwider, Patton, Rieber, Lee & Utecht

[57] ABSTRACT

This invention is directed to a combination stroller-infant seat which can be easily and quickly converted from one form to the other. The invention comprises a shell suitably shaped to hold an infant, a frame assembly for supporting the shell and retractable wheel assemblies on both sides of the frame assembly which facilitates converting from one form to the other. Each wheel assembly includes a vertically moveable central element, and a pair of wheels extensions pivotally mounted to the central element. To convert the apparatus to an infant seat, the central element is moved vertically causing the wheeled extensions to fold inwardly and then moved upwardly out of the way. To convert the apparatus to a stroller, the central element is moved downwardly so the wheeled extensions then extend laterally.

8 Claims, 2 Drawing Sheets

COMBINATION INFANT SEAT AND STROLLER

This application is a continuation of application Ser. No. 006,491, filed Jan. 23, 1987, now abandoned.

BACKGROUND OF THE INVENTION

This invention is directed to an apparatus which can be used as an infant stroller and as an infant automobile seat.

There are a wide variety of infant strollers and infant car seats available in the marketplace. Most of such devices perform a singular function, although there are some combination devices which have multiple function capabilities, e.g., strollers which can be converted into infant automobile seats and vice versa. These combination apparatus are usually mechanically complex and very inconvenient to convert from one form to the other. Moreover, although these devices are marketed as multifunction apparatus, they generally perform only one function well.

U.S. Patents describing strollers and infant seats, including combination apparatus are found in the listing below which is exemplary not exhaustive on the subject.

| U.S. Pat. No. 1,693,633 | U.S. Pat. No. 3,116,069 |
| U.S. Pat. No. 1,727,335 | U.S. Pat. No. 3,549,164 |
| U.S. Pat. No. 2,706,642 | U.S. Pat. No. 3,550,998 |
| U.S. Pat. No. 2,720,911 | U.S. Pat. No. 3,659,865 |
| U.S. Pat. No. 2,803,468 | U.S. Pat. No. 3,829,113 |
| U.S. Pat. No. 3,079,162 | U.S. Pat. No. 3,944,241 |
| U.S. Pat. No. 3,100,651 | U.S. Pat. No. 3,984,115 |
| U.S. Pat. No. 4,033,622 | U.S. Pat. No. 4,186,962 |
| U.S. Pat. No. 4,231,612 | U.S. Pat. No. 4,274,674 |

It is evident from the above patents which describe combination apparatus that several elements usually must be moved, rotated, unlatched, locked, etc. to convert from one form of the device to the other. Some of the multi-use apparatus require the seat assembly to be disengaged from the wheel assembly and the latter to be stored elsewhere, e.g. in the back of the automobile, when the unit is used as an infant car seat, which is a considerable inconvenience.

What has been needed and heretofore unavailable is a combination stroller-infant seat which can be easily and quickly converted from one form to the other without dismantling the seat assembly from the wheel assembly and without requiring removal of the infant from the seat assembly during conversion from one form to the other or requiring having the infant unattended while storing part of the apparatus. The present invention satisfies this need.

SUMMARY OF THE INVENTION

This invention is directed to an improved combination stroller-infant seat apparatus which can be easily and quickly converted from one form to the other.

The combined stroller-infant seat apparatus in accordance with the invention generally comprises an infant body supporting shell having a back and seat portions, a frame assembly supporting the body supporting shell and retractable, articulated wheel assemblies on both sides of the frame assembly. In the form of an infant seat, the wheel assemblies are folded and pulled upwardly to a retracted position with the wheels out of the way, whereas in the form of a stroller the wheel assemblies are pushed downwardly and unfolded so that the wheels are extended outwardly in an operative position. Preferably when the apparatus is in the form of an infant seat, the wheel assemblies are retracted into hollow panels provided on each side of the apparatus.

The retractable, articulated wheel assemblies include a central element provided with means to control the vertical movement thereof and a pair of opposed wheeled extensions, each of which is pivotally connected or secured at one end thereof to the central element. One or more wheels are provided at the free ends of the wheeled extensions. The central element is moved in the vertical direction by means of a handle to convert from one form to the other. To put the apparatus of the invention in the form of a stroller, the central elements of the wheel assemblies are pushed downwardly so the central element is in its lowermost position and the wheeled extensions extend outwardly or laterally in a horizontal plane. To convert the apparatus from a stroller to an infant seat, the central element of the wheeled assemblies are lifted upwardly to retract the wheel assemblies into an out-of-the-way position. Preferably, the retracted wheel assemblies are placed in a position which is high enough so that the wheels will not have significant contact with the surface on which the infant seat will be placed.

The body supporting shell is preferably pivotally mounted to the frame assembly in order to vary the reclining angle of the shell and means are also provided to lock the shell in the desired position with respect to the frame assembly.

The conversion from one form of the apparatus to the other can be effected very easily and very quickly and usually there is no need to remove the infant from the body supporting shell during such conversions.

Moreover, as is evident, with the present invention, no parts are removed so there is no need to store parts such as a wheeled frame in the trunk or storage area of an automobile vehicle as with many prior combination devices.

These and other advantages of the invention will become more apparent from the following detailed description of the invention when taken in conjunction with the accompanying exemplary drawings.

DETAILED DESCRIPTION OF THE INVENTION

Figure 1:
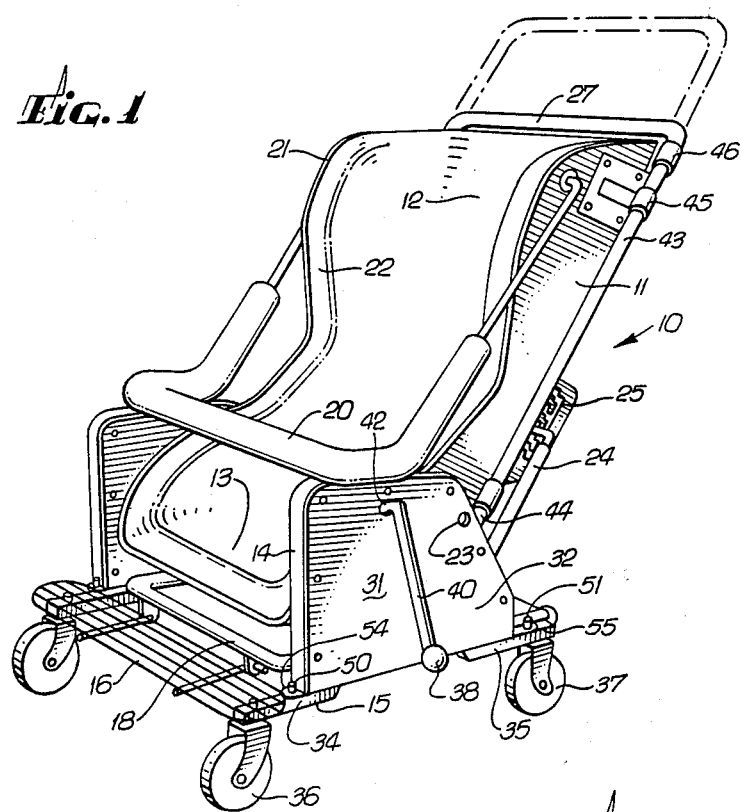
FIG. 1 is a perspective view of an apparatus embodying features of the invention which is in the form of a stroller.

Reference is made to FIG. 1 illustrating a convertible apparatus 10 in the form of a stroller embodying features of the invention. In general, the apparatus 10 comprises an infant body support shell 11 having a back portion 12 and a seat portion 13, a frame assembly 14 for supporting the body support shell 11, retractable, articulated wheel assemblies 15 on both sides of the apparatus 10.

A foot rest 16 is provided in the front of the apparatus 10 and it is pivotally mounted to the frame assembly 14 so that it can be rotated out of position when the apparatus 10 is being used as an infant seat. A padded restraint and arm rest 20 is pivotally mounted to the wing portion 21 of the back 12 of the shell 11. A padded lining 22 is preferably provided on the interior of the shell 11 as shown.

The shell 11 is pivotally mounted at 23 to the frame assembly 14 so that the reclining angle of the shell 11 can be varied so that an infant in the shell can be sitting upright or reclined at various angles with respect to the frame assembly 14. A U-shaped strut element 24 is pivotally connected at the ends thereof to the frame assembly 14 and is interconnected with the racks 25 provided on the backside 26 of the back 12 to fix the angle of the shell 11 with respect to the frame assembly 14. A collapsible push handle 27 is secured to both the frame assembly 14 and body support shell 11 for pushing the apparatus 10 in the stroller form. At least one supporting cross member 18 is provided extending between the upstanding side panels 32.

Figure 2:
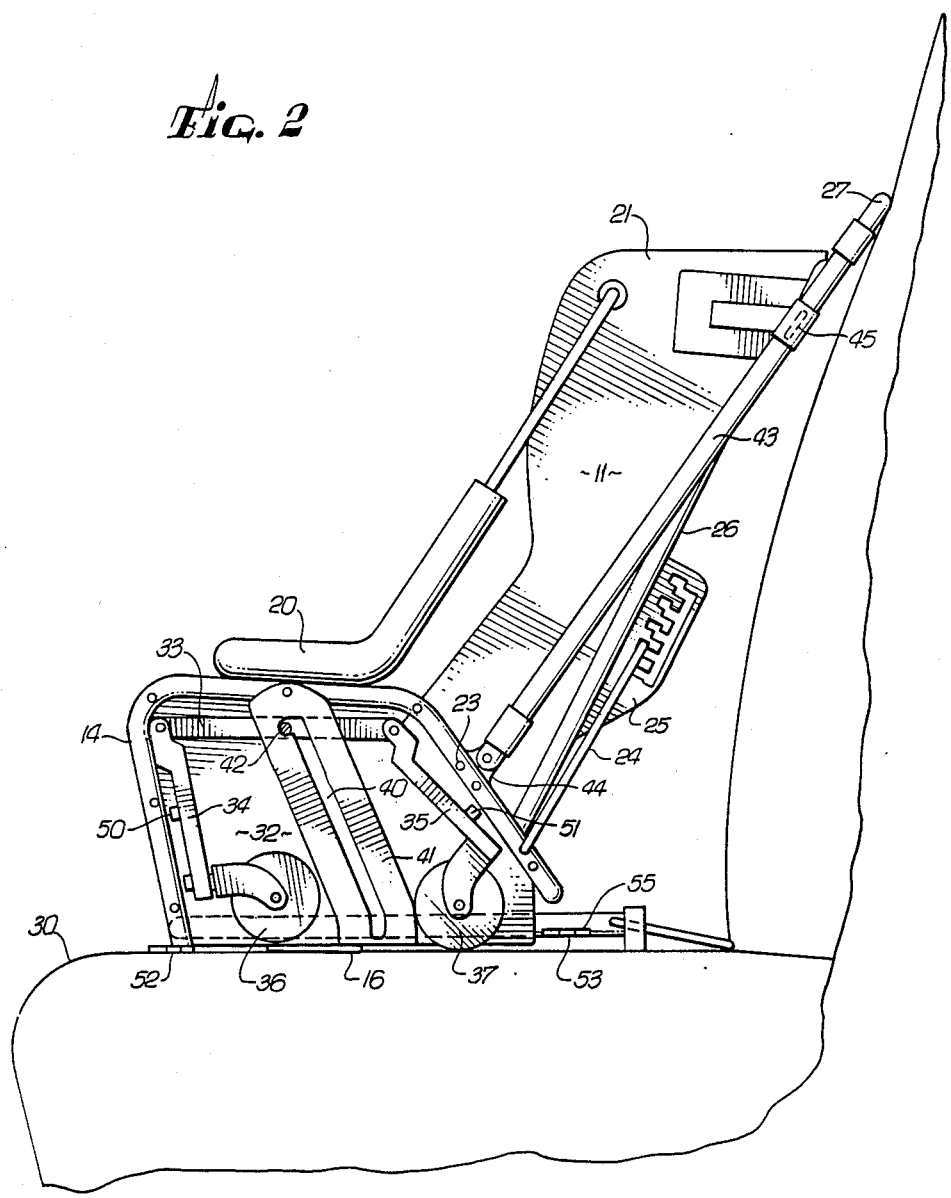
FIG. 2 is a side elevational view of the apparatus shown in FIG. 1, partially in section, which is in the form of an infant automotive seat.

In FIG. 2 the apparatus 10 is shown in the form of an infant seat on an automobile seat 30. In this drawing and in FIG. 3, the side facing 31 of hollow side panel 32 has been removed to expose the retracted articulated wheel assembly 15 therein. As shown in these drawings, the articulated wheel assembly 15 comprises a central element 33 and wheeled frame extensions 34 and 35 pivotally connected thereto. Wheels 36 and 37 are provided on the free ends of extensions 34 and 35, respectively.

A positioning control handle 38 is provided on the center element 33 and it extends through the guiding slot 40 of the guide element 41 to facilitate the vertical movement of the articulated wheel assembly 15. An offset or deviation 42 is provided at the upper end of slot 40 to lock the articulated wheel assembly 15 into a first upper position whereby the wheels 36 and 37 are pulled upwardly into an out-of-the-way position within the hollow side panel 32. Preferably, the wheels 36 and 37 should not significantly contact the auto seat 30 or other surface on which the apparatus 10 may rest.

The lower ends of tubular elements 43 of push handle 27 are pivotally mounted to the frame assembly 14 by brackets 44. The upper end of the tubular element 43 are slidably mounted in bracket 45 to facilitate changes in the reclining angle of the shell 11. In the infant seat form, the push handle 27 is preferably in a collapsed position, as shown, by loosening the threaded collars 46 on the upper ends of tubular elements 43 and pushing the legs into the tubular elements 43.

The foot rest 16 normally is not needed when the apparatus 10 is used as an infant seat so it is rotated from the position shown in FIG. 1 to that shown in FIG. 2.

The apparatus 10 in the form of an infant seat may be secured to automobile seat 30 by any suitable means such as by the seat belt (not shown) typically found in automobiles.

Figure 3:
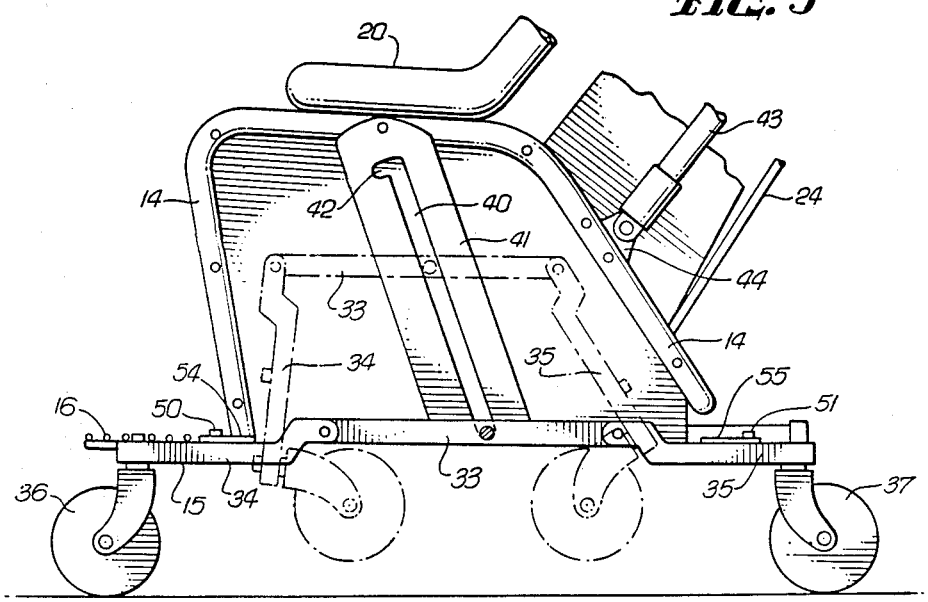
FIG. 3 is a partial side elevational view of the apparatus shown in FIGS. 1 and 2 illustrating how the apparatus is converted from one form to the other.

The apparatus 10 of the invention is easily and quickly converted from one form to the other by moving the control handle 38 up or down the slot 40 in the guide element 41. FIG. 3 illustrates the conversion from one form to the other.

The wheeled frame extensions 34 and 35 are provided with projecting elements 50 and 51 respectively on the upper surface thereof. These projecting elements interfit into the openings 52 and 53 provided in positioning elements 54 and 55 respectively which are secured to the frame elements 14 to thereby position and stop the wheeled extensions 34 and 35 when they are pivoted outwardly.

To convert the stroller shown in FIG. 1 to the infant seat form shown in FIG. 2, usually all that is needed is to loosen the threaded collars 46 on the push handle 27, push the upper portion of the handle 27 into the tubular elements 43 and then retighten the collars 46. Both handles 38 on both sides of the apparatus 10 are lifted and as the central unit is pulled upwardly, the wheeled extensions 34 and 35 fold inwardly by pivoting about their ends connected to the central element 33. The handle 38 is placed into the offset portion 42 of slot 40 to lock the wheel assembly 15 into a first upper position with the wheels 36 and 37 out of the way. The foot rest 16 may then be rotated to a position underneath the wheel 36 as shown.

To convert the apparatus 10 from the form of an infant seat to the stroller form, the procedure is reversed. The foot rest 16 is rotated into position in front of apparatus 10, the handles 38 are lifted out of the locked position and then moved downwardly in slot 40 to urge the wheeled extensions 34 and 35 downwardly and then the extensions are moved outwardly into position with the projections 50 and 51 interfitting into the holes 52 and 53 in positioning elements 54 and 55. If desired, means can be provided to further lock the wheeled extensions 34 and 35. The collars 46 are loosened, the push handle 27 lifted into position and then the collars 46 are retightened so that the apparatus 10 is ready for use as a stroller.

The shell 11 is preferably molded from high impact resistant plastic product, whereas the frame assembly 14 and wheel assemblies 15 are preferably extruded metal (e.g., aluminum) products.

Various modifications can be made to the present invention. For example, the frame assembly and the shell can be integrated into a singular unitary structure. Other improvements and modifications can be made to this invention without departing from the scope thereof.

What is claimed is:

1. A combination infant seat-stroller apparatus comprising:
   (a) a frame assembly having opposing upstanding hollow side panels and at least one supporting cross member;
   (b) an infant body support shell having back and seat portions secured to the frame assembly between the opposing upstanding side panels;
   (c) a pair of articulated wheel assemblies, each wheel assembly being retractable within one of said opposing upstanding side panels of the frame assembly and having a central element, a pair of elongated extension elements each pivotally mounted on one end thereof to opposing ends of the central element and a wheel mounted on the free end of each of such extension element; and
   (d) separate means to vertically move each articulated wheel assembly to a first upper position within one of the opposing upstanding side panels wherein the extension elements are pivoted inwardly toward one another in a vertical orientation with the wheels positioned out of the way above the lower edge of the frame assembly so the apparatus may be used as an infant seat and to a second lower position wherein the extension elements may be pivoted outwardly away from one another to extend laterally from the central element with the wheels in an operative position below the lower edge of the frame assembly and fore and aft of the opposing side panels so the apparatus may be used as a stroller.

2. The apparatus of claim 1 wherein means are provided to pivotally mount the infant body support shell to the frame assembly and means are provided to vary the position of the shell about the pivotal mounting.

3. The apparatus of claim 1 wherein the separate means for moving each of the wheel assemblies includes a handle to manually move the wheeled assembly to the first and second positions.

4. The apparatus of claim 1 wherein means for moving the wheeled assemblies include a means to guide the vertical movement of the central element between the first and second positions.

5. The apparatus of claim 4 wherein the guide means is provided with a vertically oriented slot through which a handle secured to the central element projects.

6. The apparatus of claim 5 wherein the upper portion of the slot has an offset which fixes the central element in the first upper position.

7. The apparatus of claim 1 wherein the extensions of each wheel assembly are provided with projections on the upper portion thereof which are seated into a recess or aperture provided on the frame assembly to fix the wheel assembly in the second lower position.

8. The apparatus of claim 2 wherein means are provided to fix the position of the shell about the pivotal mounting.

* * * * *